(12) United States Patent
Cahn et al.

(10) Patent No.: US 6,486,828 B1
(45) Date of Patent: Nov. 26, 2002

(54) ADAPTIVE ARRAY ANTENNA NULLING

(75) Inventors: Charles R. Cahn, Manhattan Beach, CA (US); Donald Leimer, Rancho Palos Verdes, CA (US)

(73) Assignee: Western Multiplex, Long Beach, CA (US)

( * ) Notice: Subject to any disclaimer, the term of this patent is extended or adjusted under 35 U.S.C. 154(b) by 0 days.

(21) Appl. No.: 09/626,203

(22) Filed: Jul. 26, 2000

(51) Int. Cl.[7] ............ H01Q 21/06; G01S 3/16; H04B 1/06; H04B 1/10
(52) U.S. Cl. .......... 342/363; 342/383; 455/278.1; 455/296
(58) Field of Search ............ 342/363, 365, 342/362, 380, 383; 455/278.1, 63, 562, 276.1, 295, 296

(56) References Cited

U.S. PATENT DOCUMENTS

| | | | |
|---|---|---|---|
| 4,152,702 A | 5/1979 | Piesinger | 343/100 SA |
| 4,298,873 A | 11/1981 | Roberts | 343/100 SA |
| 4,584,713 A | 4/1986 | Bruckert et al. | 455/277 |
| 4,596,986 A | 6/1986 | Andrews et al. | 343/373 |
| 4,670,885 A | 6/1987 | Parl et al. | 375/1 |
| 5,107,273 A | 4/1992 | Roberts | 342/417 |
| 5,298,908 A | 3/1994 | Piele | 342/363 |
| 5,363,111 A * | 11/1994 | Murphy | 342/383 |
| 5,649,287 A | 7/1997 | Forssen et al. | 370/312 |
| 5,691,727 A * | 11/1997 | Cyzs | 342/361 |
| 5,712,641 A | 1/1998 | Casabona et al. | 342/362 |
| 5,724,666 A | 3/1998 | Dent | 455/562 |
| 5,818,517 A * | 10/1998 | Hudson et al. | 455/278.1 |
| 5,963,874 A | 10/1999 | Mahler | 455/562 |
| 6,232,921 B1 * | 5/2001 | Aiken et al. | 342/383 |

OTHER PUBLICATIONS

Kaptsis, I et al, "Base Station Polarization–Sensitive Adaptive Antenna for Mobile Radio", Third Annual International Conference on Universal Personal Communications, Sep. 1994, pp. 230–235.*

Weiss, A. et al. "Maximum Likelihood Signal Estimation For Polarization Sensitive Arrays", IEEE Trans. on Antennas and Propagation, vol. 41, No. 7, Jul. 1993, pp. 918–925.*

* cited by examiner

Primary Examiner—Gregory C. Issing
(74) Attorney, Agent, or Firm—Irell & Manella LLP

(57) ABSTRACT

An adaptive antenna array employs selective polarization nulling and spatial nulling to receive desired signals in the presence of jamming signals. The desired signals have the same circular polarization, and the array includes at least one antenna element having an opposite circular polarization to null jamming signals having an opposite circular polarization. A gain pattern for the array is selected to minimize signals having the same circular, or linear, polarization. The gain pattern is computed based on jamming signals received when no desired signals are transmitted, or selected based on measured desired signals.

80 Claims, 8 Drawing Sheets

ADAPTIVE ARRAY ANTENNA NULLING

BACKGROUND OF THE INVENTION

Conventional signal reception systems are degraded in signal-to-noise ratio performance because of the presence of undesired signals that enter the system by the main lobe or the side lobes of an antenna. Such signals may consist of hostile, deliberate interference or non-hostile unintentional interference. Natural noise sources almost always exist and in certain systems, received signals are reflected from "clutter" in the antenna field. As communication traffic by wireless and other media increases substantially, poor siting conditions and multipath beam effects add to a worsening interference environment. Newer, unlicensed radio stations using "weak signal" communication are particularly vulnerable to interference from other stations operating on the same frequencies. Interference with desired signals by signals on the same or very near frequency is often referred to as "jamming" even in cases which are non-deliberate. To insure the quality of service expectations of users of such systems, it is important that they be able to transmit and receive traffic without interference from jamming signals.

In the book by Robert A. Monzingo and Thomas W. Miller, entitled *Introduction to Adaptive Arrays*, John Wiley and Sons, New York, 1980, the authors describe adaptive antenna arrays that have been used as a solution to problems of signal detection in severe interference environments.

U.S. Pat. No. 5,724,666 was issued on Mar. 3, 1998 to Paul W. Dent and is entitled Polarization Diversity Phase Array Cellular Base Station and Associated Methods. The Patent describes a base station which includes a first and second antenna array receiving first and second rotational polarizations and a polarization diversity receiver connected to the first and second arrays.

In his U.S. Pat. No. 5,691,727, Adaptive Polarization Diversity System, issued on Nov. 25, 1997, Baruch Cyzs describes an adaptive polarization diversity system for radio link communication. Hans Mahler was issued U.S. Pat. No. 5,963,874 for a Radio Station Arranged for Space Diversity and Polarization Diversity Reception, Oct. 5, 1999. The patent describes antennas arranged for reception of signals with different polarization directions for achieving polarization diversity reception.

U.S. Pat. No. 4,298,873 is entitled Adaptive Steerable Null Antenna Processor and was issued on Nov. 3, 1981 to Eugene L. Roberts. The invention described in this Patent is an adaptive array system which steers a plurality of antennas to direct a null toward an undesirable source of interference, in order to reduce noise and enhance detection of signals.

Eugene J. Bruckert, et al. were granted U.S. Pat. No. 4,584,713: Signal Quality Steered Diversity on Apr. 22, 1986. The Patent discloses a circuit and technique for directing an adaptive antenna system. U.S. Pat. No. 5,649,287, issued Jul. 15, 1997, to Ulf Göran Forssén, et al., entitled: Orthogonalizing Methods for Antenna Pattern Nullfilling, discloses a method of broadcasting in a cellular communication system where common information creates orthogonal signals.

Eugene L. Roberts was granted U.S. Pat. No. 5,107,273 entitled Adaptive Steerable Null Antenna Processor With Null Indicator in April, 1992. The disclosure describes an adaptive array system which steers a plurality of antennas to direct a null toward an undesired source of interference to reduce noise and enhance detection of desired signals.

U.S. Pat. No. 4,670,885 issued to Steen A. Parl, et al. and entitled Spread Spectrum Adaptive Antenna Interference Canceller, describes an adaptive power equalizer circuit for use in a spread spectrum receiver system.

A Sidelobe Canceller with Adaptive Antenna Subarraying Using a Weighted Butler Matrix is the subject of U.S. Pat. No. 4,596,986 which was issued to Grealie A. Andrews, et al. on Jun. 24, 1986. An apparatus for nulling signals from unwanted interference sources is disclosed.

U.S. Pat. No. 4,152,702 is entitled Adaptive Antenna Lobing on Spread Spectrum Signals at Negative Signal-to-Noise Ratio. It discloses a communications system including a multiple antenna array with null steering apparatus.

What is currently needed is a method and system for discriminating against unwanted, interfering signals from a fixed source, while maintaining the antenna gain in respect of receiving desired signals. The invention provides a solution to this and other problems.

SUMMARY OF THE INVENTION

In one aspect of the present invention, a method is provided for receiving desired signals having a desired circular polarization in the presence of interfering signals, comprising receiving the desired signals and interfering signals in a first antenna having the desired circular polarization to form a first output signal, receiving the interfering signals in a second antenna having an opposite circular polarization to the desired circular polarization to form a second output signal, and combining the first and second output signals to minimize the interfering signals.

In a further aspect of the invention, the output signals are weighted prior to linearly combining the output signals to minimize the interfering signals. Weighting the output signals may include selecting a first gain for the first antenna and a second gain for the second antenna, deriving complex weights for each antenna corresponding to the selected first gain and second gain, applying the complex weights to the respective output signals, and linearly combining the weighted output signals to minimize the interfering signals.

In another aspect of the invention, receiving the interfering signals may comprise receiving the interfering signals in the first and second antennas over a period of time during which no desired signals are transmitted, and selecting the first and second gains comprises selecting the first and second gains to minimize one or more of the received interfering signals. Receiving the desired signals may alternatively comprise measuring a performance value for the desired signals, and selecting the first gain comprises selecting the first gain to maximize the performance value for one or more of the received desired signals.

A BRIEF DESCRIPTION OF THE DRAWINGS

Figure 4:
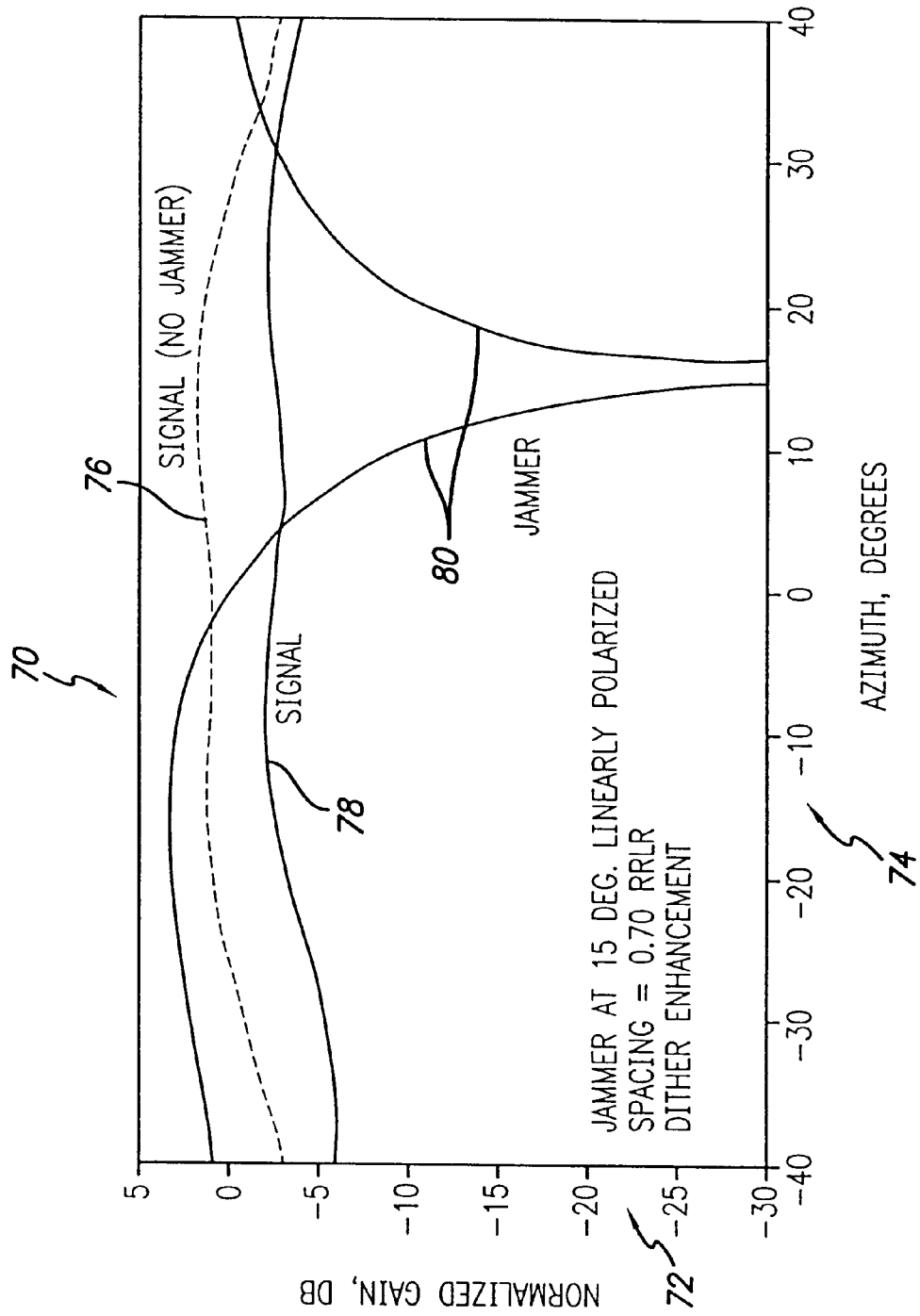

FIG. 4 presents a chart of normalized antenna gain vs. azimuth for a four-element antenna array using gain pattern optimization by matrix inverse nulling with dither enhancement according to the invention.

Figure 5:
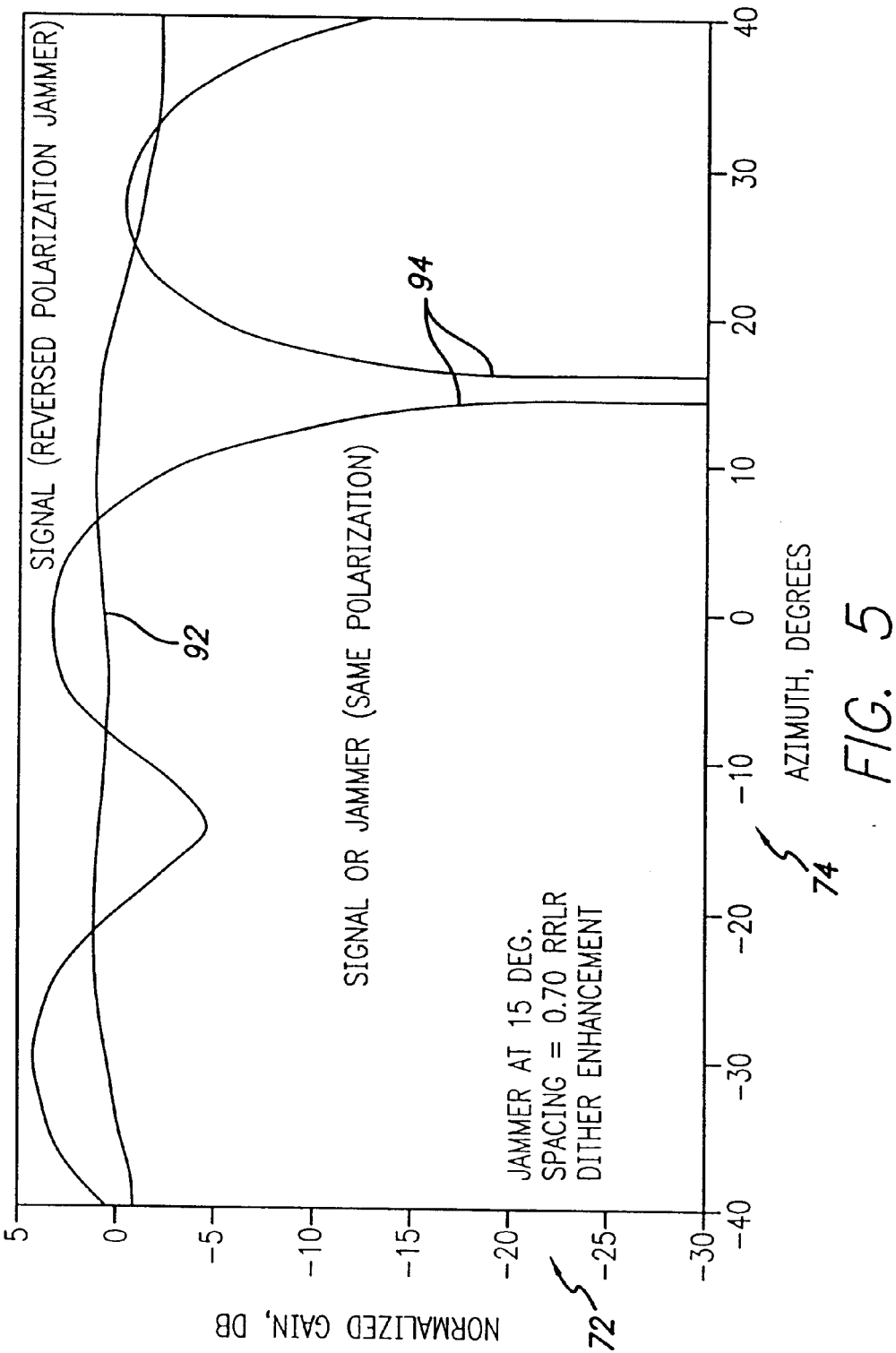

FIG. 5 is another chart of normalized antenna gain vs. azimuth for a four-element antenna array using matrix inverse nulling with dither enhancement according to the invention.

Figure 6:
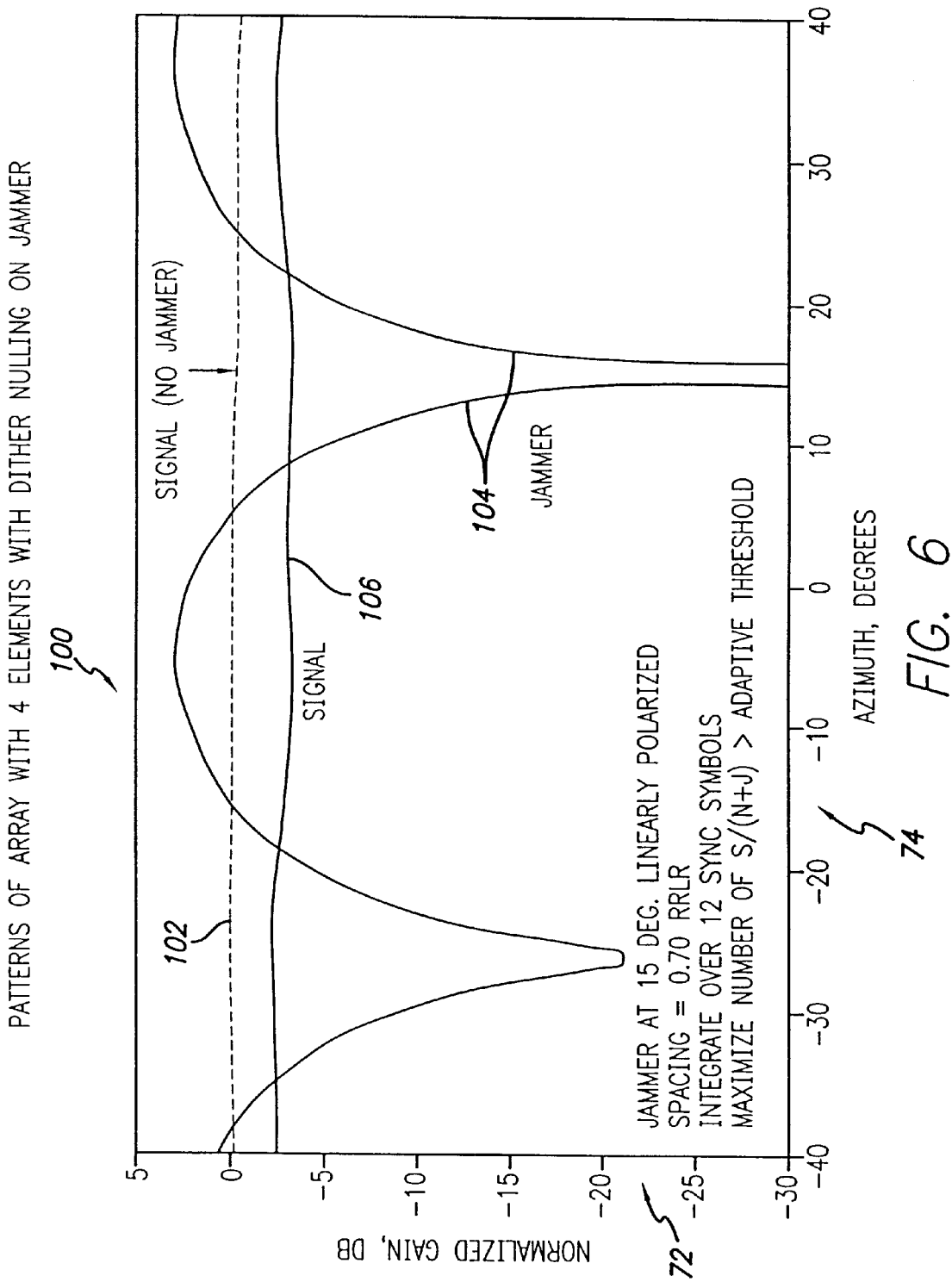

FIG. 6 presents yet another chart of normalized antenna gain vs. azimuth for a four-element antenna array using optimization by measured array performance and dither nulling on the jamming signal according to the invention.

Figure 7:
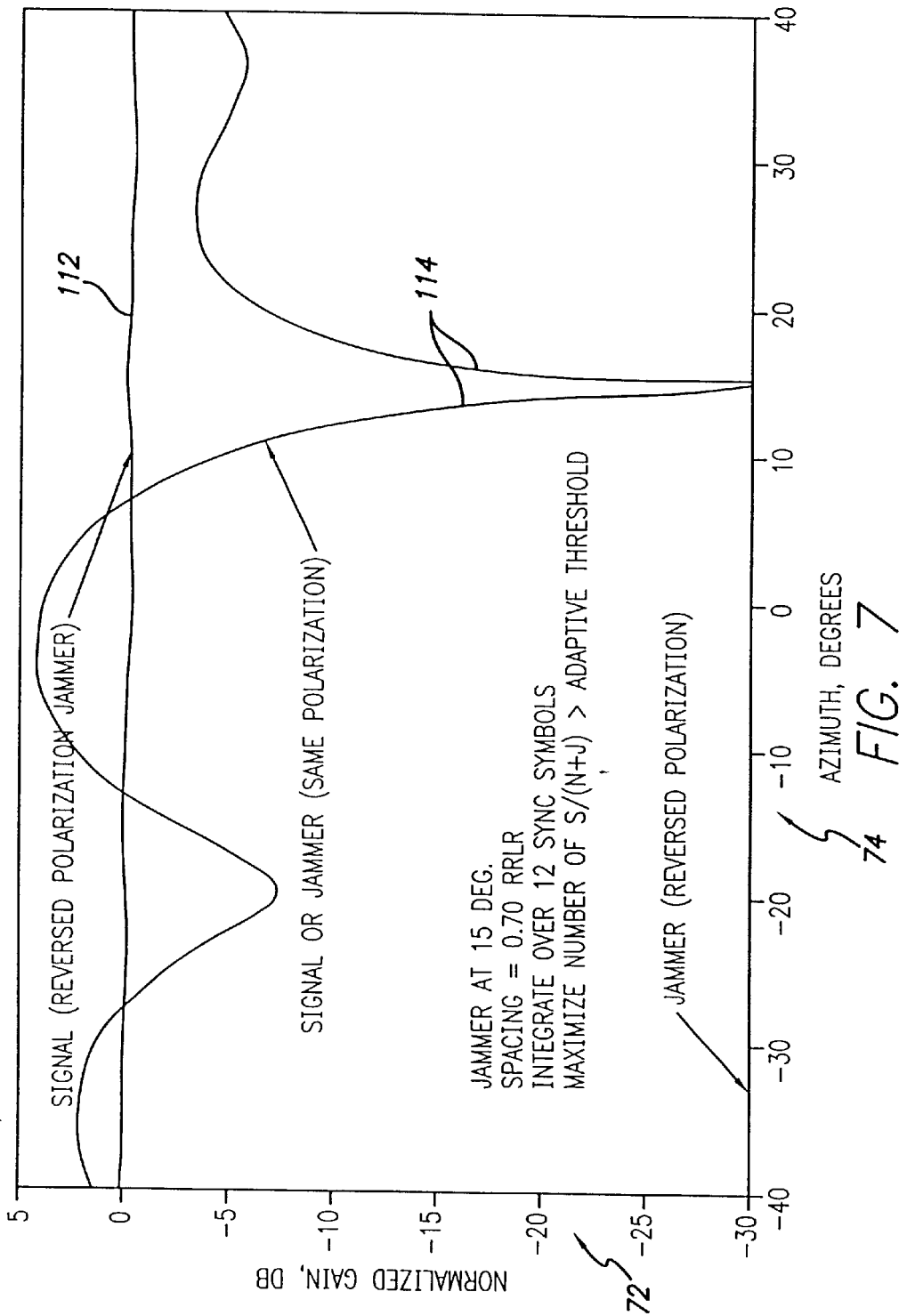

FIG. 7 is also a chart of normalized antenna gain vs. azimuth for a four-element antenna array using optimization by measured array performance and dither nulling on a jammer signal according to the invention.

DETAILED DESCRIPTION OF THE INVENTION

The disclosed invention comprises an adaptive antenna array that forms nulls on undesired signals and noise while maintaining gain on desired signals. The antenna comprises N sensor elements which preferably are arranged in an equally-spaced, linear pattern. Alternatively, the sensor elements may be arranged in a circular pattern or other plane pattern such as rectangular or L-shaped.

Desired signals with unknown directions of arrival are received within a specified azimuth sector. The jamming signal is received within the specified sector but in other sectors it is attenuated by the directivity of the antenna elements. It is an objective of the present invention to control the adaptive antenna array to produce nulls on the undesired or "jamming" signals but not on the desired signals. It is another objective of the present invention not to be limited to signals in any one plane but to operate in a sector of a spherical field.

Array control is accomplished by adjusting the complex weight of each antenna element and performing a linear summation of the weights in a sum and nulling processor. In a preferred embodiment of the invention, the weighting is done by digital processing, where the received signal from each antenna element and RF has been sampled and quantized by an analog-to-digital converter (ADC). The quantized samples, of the complex form I+jQ, are multiplied by the complex weights and summed to give the output of the array.

In a preferred embodiment of the invention, a two-way communication system utilizes time division duplexing (TDD). Typically in such a system, a plurality of users transmit information packets to a network base station. The base station then distributes the information packets to requested services connected to the network. Responses from these services are sent back to the appropriate user by the base station. The transmissions, therefore take place in both directions over the network links. The TDD duplex frame typically consists of an uplink segment which carries the packets from users to the base station, and a downlink segment which carries responsive information and messages from the base station to the users. The TDD frame has a "guard" time gap between the uplink and downlink transmissions. The guard time gap is a period when there are no transmissions. The desired signals are momentarily turned off and the antenna array is inactive for transmitting and receiving desired signals. The guard time gap is available to collect signal samples that can enable control of the adaptive antenna array. The gap is useful since the undesired signals are likely to be present, while the desired signals will not be.

A preferred method of nulling a single jammer is to use selective polarization discrimination. The antenna array includes a plurality of sensor elements, at least one having a preferred, same polarization and at least one of said sensor elements having an opposite polarization. The desired received radiated signals have the preferred polarization. The desired received radiated signals will be accepted by the same-polarized sensor elements. If the undesired (jamming) received radiated signals have the opposite polarization, the sensor elements having the preferred polarization will reject or suppress them. More generally, if the undesired signals have a combination of two orthogonal polarizations, for example linear polarization, and the desired signals are right or left-hand circular polarized, a properly weighted sum of all of the signals from said same-polarized sensor elements and opposite-polarized sensor elements results in nulling the undesired signals without significantly reducing the strength of the desired received radiated signals.

If the desired signals are right-hand circularly polarized and all of the antenna elements have the same right-hand circular polarization except one that is left-hand circularly polarized, the result will be that all antenna elements but that one will respond to the desired signals. The left-hand or opposite-polarized element will not respond to the desired signals. If a jamming signal is opposite-polarized from the desired signals, that is, left-hand circular polarized, simply by turning off the left-hand polarized element, the jamming signal will automatically be nulled without affecting reception of the desired signals. If the jammer is linearly polarized, for example vertically or horizontally polarized, it is nulled by controlling the weight of the opposite-polarized element relative to one or more of the same-polarized elements, for example, by a least mean square (LMS) algorithm. The LMS algorithm minimizes the array power output during the time gap in transmissions. The weighting of the opposite-polarized element to null the jammer has no effect on the array gain for the desired signals. This jammer-nulling technique is generalized to more than one jammer by having a number of opposite-polarized antenna sensors.

If the jammer has the same polarization as the desired signals, it is nulled by control of all the same-polarized elements to form a spatial null in the direction of the jammer. The antenna weights now affect the array gain for the desired signals. In particular, the gain will be low in a direction near the direction of the jammer. Additional pattern nulls may develop in other directions as well.

A common problem when nulling jammer signals by an antenna array is that the array gain for desired signals is reduced undesirably in some directions of arrival. The present invention includes, in one preferred embodiment, an array control procedure to optimize the computed array gain pattern for desired signals in as many different directions of arrival as possible which tends to equalize the computed gain pattern for as many directions as possible. During the "quiet time" of the TDD frame guard- band gap, jamming is cancelled by adaptively weighting and summing signals from the sensor elements.

A preferred method to obtain the solution for the adaptive weight vector W is sample matrix inversion. This method enables spatial nulling of several jammers. The matrix of the cross-correlations is denoted by R. As is well known, the complex vector of the array weights is obtained by inverting the matrix R and multiplying by the steering vector b to obtain the solution. The complex weight for each antenna element is adjusted in accordance with the solution, and a linear summation of the weights is performed in a sum and nulling processor. In one preferred embodiment of the invention, the weighting is done by digital processing, where the received signal has been sampled and quantized by an analog-to-digital converter (ADC). The quantized samples, of the complex form I+jQ, are multiplied by the complex weights and summed to give the output of the array. The present invention includes dithering the weights of antenna signals to improve a computed signal-to-noise ratio for receiving desired signals by the array. To start the optimization, the steering vector is arbitrarily initialized, for example, one component of the vector is set to unity and all others set to zero. Then each component of the vector (real or imaginary part of the selected component) is varied by a small amount positively or negatively and the solution of the matrix equation is found. The resultant array gain pattern is computed for the desired signals. The component of the steering vector is adjusted so as to improve the array gain pattern for desired signals in accordance with a specified criterion for optimization. The process is continued, adjusting each component of the vector in sequence to improve the array gain pattern.

A criterion for nulling performance is the number of directions of arrival, over the design range, for which the computed gain pattern exceeds the threshold. An adaptive threshold ensures antenna gain pattern optimization. The dither scheme acts to increase the number. Because the gain pattern is determined by the actual jamming, the threshold needs to be adaptive. Therefore, the threshold is raised by a design factor if the number of arrivals exceeding the threshold is too large. The threshold is lowered by a design factor if the number exceeding the threshold is too small.

The invention takes full advantage of differences in desired and undesired signal polarization but makes no explicit assumptions on the characteristics of the jamming. In a worst case the jamming signal has the same polarization as the desired signals and nulling based on polarization is unavailable. Therefore, nulling in such case must be spatial and the computed pattern will have nulls for directions of arrival near that of the jamming signal. Nevertheless, for any jamming condition, the dither scheme still optimizes the gain pattern for desired signals.

In an alternative embodiment of the present invention, measurements are made of received desired signals by a weighted summation of the signals received on the various antenna elements. The weights of sensor elements are adjusted to optimize the performance measure for all desired signals being demodulated. This approach automatically creates nulls on the jamming signals and matrix inverse nulling is not needed.

As differentiated from the computed gain pattern discussed earlier, the array performance in this embodiment is the number of actually received desired signals for which the performance measure exceeds a threshold. Here again, because the gain pattern is determined by actual jamming, the threshold needs to be adaptive. In this embodiment the threshold is raised if the performance measure of too many of the desired signals exceeds the threshold and is lowered if too few of the desired signals exceeds threshold.

The dither scheme in this embodiment also takes full advantage of differences in desired and undesired signal polarization and makes no explicit assumptions on the characteristics of the jamming. Since a worst case the jamming signal has the same polarization as the desired signals and nulling based on polarization is unavailable, nulling in such case must be spatial. The computed pattern will necessarily have nulls in directions of arrival near that of the jamming signal. Nevertheless, for any jamming condition, the dither scheme still optimizes the gain pattern for desired signals.

Figure 1:
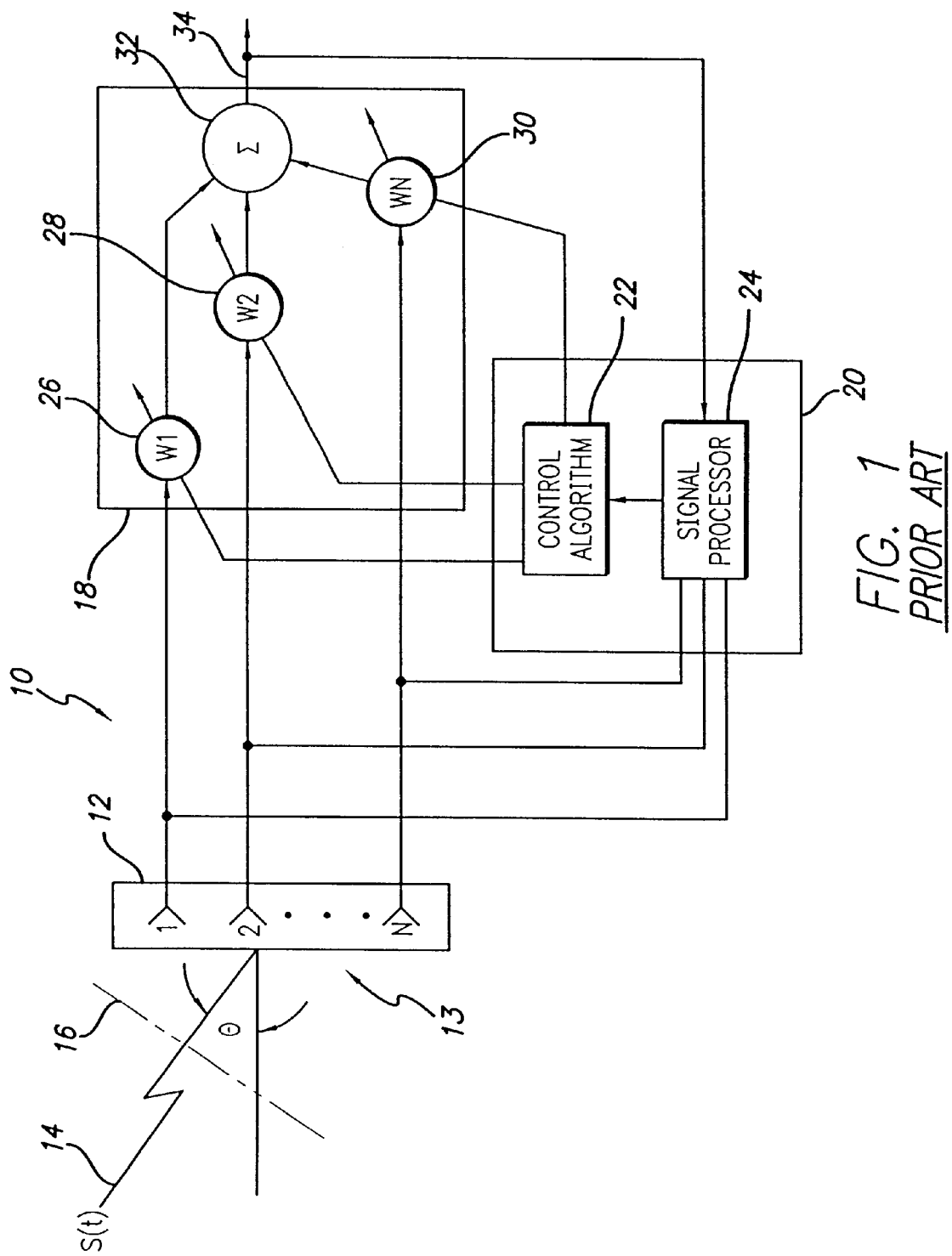
FIG. 1 is a functional diagram of an N-element adaptive antenna array illustrating the prior art.

FIG. 1 is a functional diagram of an N-element adaptive antenna array 10 illustrating the prior art. It shows a plane wave front 16, incident on the antenna 12 sensor elements 13 at angle θ. The array 10 receives signals s{t} in a propagation medium of interest. The sensors 13 are arranged to give coverage, that is, a gain pattern over a desired spatial region. The output of each of the N elements is coupled to an array pattern-forming network 18. In the network 18, each sensor element output is multiplied by a "complex" weight 26, 28,[ . . . ],30 having both amplitude and phase (or the equivalent with real weights), then summed with all other weighted sensor element outputs to form the overall adaptive array output signal 34. The weight values 26, 28,[ . . . ],30 in conjunction with the physical arrangement of the sensors 13 determine the array beam sensitivity or gain pattern.

Figure 2:
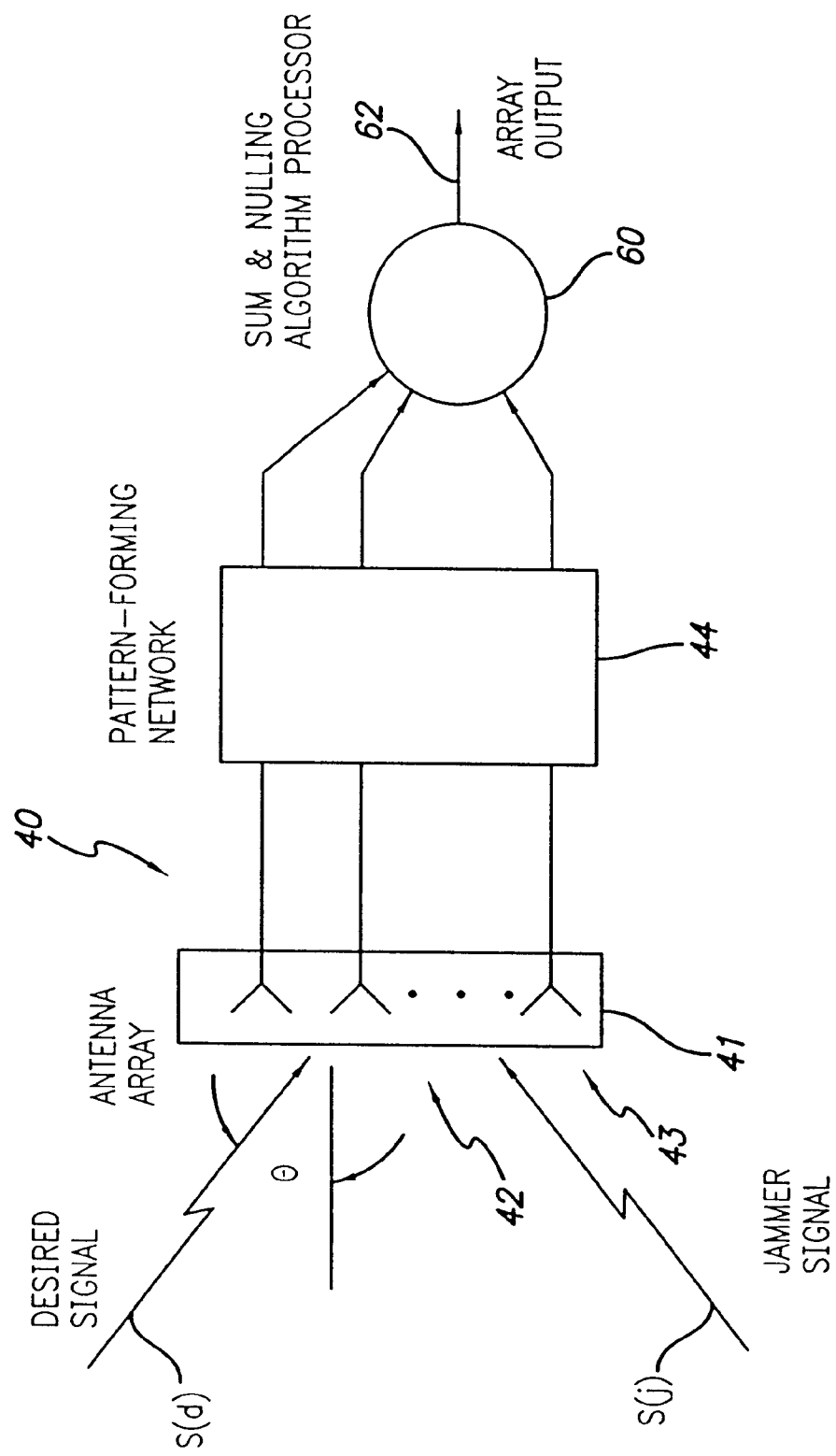
FIG. 2 is a functional block diagram of an adaptive antenna array according to the invention.

FIG. 2 depicts a functional block diagram of an adaptive array antenna 40 according to the invention which shows antenna sensor elements 42, 43, pattern forming network 44, and sum and nulling processor 60. The adaptive array antenna 40 includes one or more sensor elements 42, 43 having a preferred, same polarization and at least one sensor element having an opposite polarization. Desired received radiated signals S{d} have the preferred polarization. When undesired received radiated signals S{j} have the opposite polarization, the undesired signals S{j} are rejected or suppressed by the same-polarized sensor elements and accepted by the opposite-polarized sensor elements. A properly weighted sum of all of said signals S{d}, S{j} from the same-polarized sensor elements and the opposite-polarized sensor element null the undesired received radiated signals S{j} without significantly reducing the strength of the desired received radiated signals S{d}.

Figure 2A:
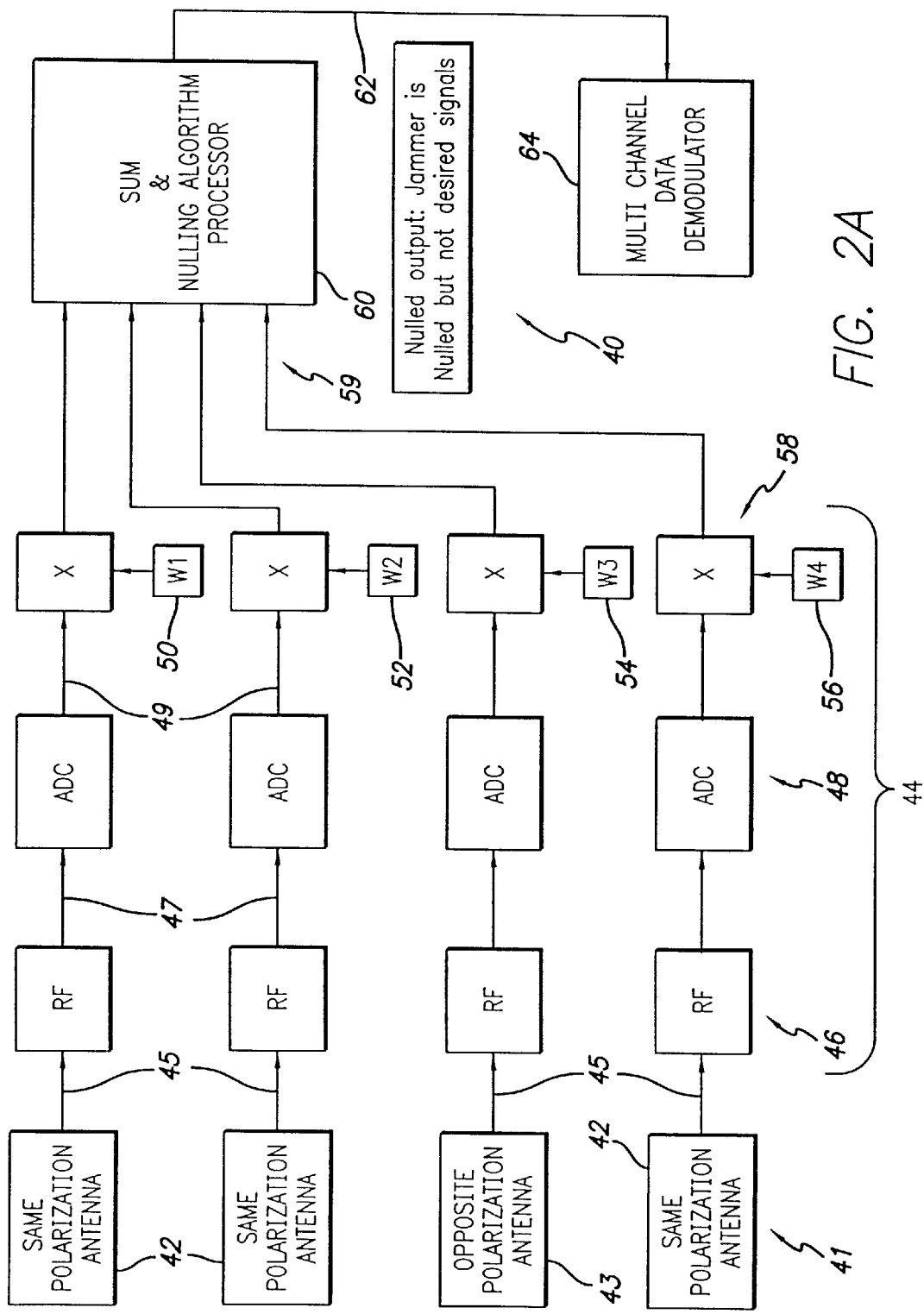
FIG. 2A is functional block diagram of a four-element adaptive antenna array according to the invention.

For illustration purposes, FIG. 2A shows one preferred embodiment of the apparatus including four radio-frequency antenna sensor elements 42, 43. These antenna sensor elements 42, 43 cover a sector of about 60 degrees. The antenna elements 42, 43 are polarized. The direction of polarization may be varied. In FIG. 2A, three antenna elements 42 are shown as having the same polarization, preferably circular polarization. One antenna element 43 is opposite-polarized from the others. Of course, additional antenna elements may be added to obtain greater coverage.

A person skilled in the art will recognize that while radio frequency (RF) signals are illustrated, signals of much higher frequency and propagated in media other than the atmosphere are contemplated by the invention.

Received signals 45 from the antenna elements 42, 43 are processed in a pattern forming network 44. In one preferred embodiment, first signal processing is by RF stages 46. The signals are then digitized in analog-to-digital converters (ADC) 48. The outputs of the ADC's are then multiplied by the complex weights 50, 52, 54, 56 in respective multipliers 58. The multiplier 58 outputs are then summed and processed in Sum and Nulling Algorithm Processor 60 which nulls an interfering signal but not in the directions of desired signals.

In an alternate embodiment which optimizes the array gain pattern using measured array performance, the processed signals 62 are passed to a multi-channel data demodulator 64 for extraction of the performance metric information carried on the signals.

A useful application of the present invention, involves a two-way communication system which utilizes time division duplexing (TDD) of the transmissions. Typically in such a system, a plurality of users transmit information packets to a network base station. The base station then distributes the information packets to requested services connected to the network. Responses from these services are sent back to the appropriate user by the base station. The transmissions, therefore, take place in both directions over the network links. To insure the quality of service that the users expect of the network, it is important that the user community be able to transmit traffic to the base station without interference from jamming signals S{j}.

Figure 3:
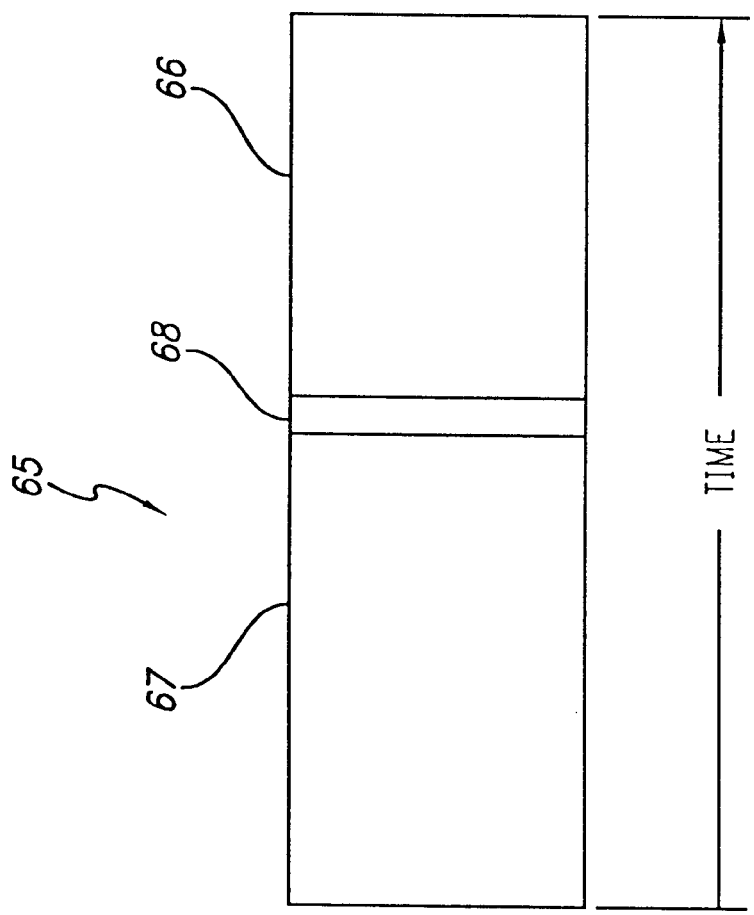
FIG. 3 is a schematic diagram of a time division duplex (TDD) frame that may be employed with the invention.

FIG. 3 shows a schematic diagram of a time division duplex transmission frame 65. The TDD frame 65 typically consists of an uplink segment 66 which carries the packets from users to the base station, and a downlink segment 67 which carries responsive information and messages from the base station to the users. The TDD frame 65 has a "guard" time gap 68 between the uplink 66 and downlink 67 transmissions. The guard time gap 68 is a period when there are no transmissions of desired signals S{d}. The desired signals S{d} are momentarily turned off. The guard time gap 68 is available to make receiver measurements that can enable control of the adaptive antenna array 40. The gap 68 is useful since the undesired signals S{j} are likely to be present, while the desired signals S{d} will not be.

A preferred method of nulling a single jammer signal is based on polarization discrimination. In one embodiment, the desired signals S{d} are circularly polarized, for example, right-hand, and all but one of the antenna elements 42 have the same circular polarization. The remaining antenna element 43 is opposite circular-polarized, that is left-hand. It does not respond to the desired signals S{d}. Then, if a jammer signal is left-hand polarized, simply by turning off the left-hand polarized antenna element 43, the jammer signal is automatically nulled without affecting reception of the desired signals. If the jammer signal is linearly polarized, it is nulled by controlling the weight 54 of the opposite-polarized element relative to one or more of the same-polarized elements 50, 52, 56, for example, by a least mean square (LMS) algorithm, to minimize the array power output. The weighting of the opposite-polarized element 43 to null the jammer signal has no substantial effect on the array gain for the desired signals S{d}. This jammer-nulling technique is generalized to more than one jammer signal by having a number of opposite-polarized antenna elements 43.

If the undesired signals S{j} have a combination of two orthogonal polarizations, for example linear polarization, and the desired signals S{d} are right or left-hand circular polarized, a properly weighted sum of all of the signals S{d}, S{j} from the same-polarized sensor elements 42 and the opposite-polarized sensor elements 43 results in nulling the undesired signals S{j} without significantly reducing the strength of the desired received radiated signals S{d}.

If the jammer signal S{j} has the same polarization as the desired signals S{d}, it is nulled by control of all the same-polarized elements 42 to form a spatial null in the direction of the jammer signal. However, the antenna weights 50, 52, 54, 56 now affect the array gain for the desired signals. In particular, the gain will be low in a direction θ near the direction of the jammer signal S{j}. Additional pattern nulls may develop in other directions as well. The present invention includes an array control procedure to maximize the array gain in as many different directions as possible in order to maintain communication with as many different desired signals as possible.

Array control is accomplished by adjusting the complex weight 50, 52, 54, 56 of each antenna element 42, 43 and performing a linear summation of the weights 50, 52, 54, 56 in the sum and nulling processor 60. In a preferred embodiment of the invention, the weighting is done by digital processing, where the received signal has been sampled and quantized by the analog-to-digital converter (ADC) 48. The quantized samples, of the complex form I+jQ, are multiplied by the complex weights 50, 52, 54, 56 and summed to give the output 62 of the array 40.

The present invention includes, in one preferred embodiment, a method of preserving signal gain while maximizing nulling. The method includes an array control procedure to optimize the computed array gain pattern for desired signals S{d} in as many different directions of arrival θ as possible which tends to equalize the computed gain pattern for as many directions θ as possible. During the "quiet time" of the TDD frame guard-band gap, jamming is cancelled by adaptively weighting and summing signals from the sensor elements.

For simplicity in the following discussion, the antenna elements 42, 43 are assumed to be omnidirectional within the coverage sector θ; however, it is only necessary for the elements 42, 43 to have matched gains. More generally, if the elements 42, 43 do not have matched gains, the same principle of operation applies if all the elements 42, 43 have known patterns, known gain and phase as a function of direction of signal arrival. Azimuth patterns are considered in this discussion, although a person ordinarily skilled in the art will appreciate that patterns in elevation are similarly treated.

Nulling is done by sample matrix inversion which enables spatial nulling of several jammer signals. The matrix of the cross-correlations of signal samples collected during the quiet time is denoted by R. As is well known, the complex vector of the array weights W is obtained by inverting the matrix R to get the solution:

$$w = R^{-1} b \qquad \text{Equation (1)}$$

where b denotes the complex steering vector.

For receiving a single desired signal, b is the cross-correlation between the signals at each antenna sensor element 42, 43 and the desired signal. There is, however, a more general problem of receiving a plurality of signals from all directions θ within the coverage sector of the array 40. For the following discussion, the preferred linear array embodiment is proposed with a spacing d between adjacent elements. For a typical half-wavelength spacing, d=λ/2, the element interaction can be neglected. Henceforth, d is expressed as a specified fraction of the wavelength λ.

The array performance can be quantified by defining an objective metric S/(N+J) as a function of the angle of arrival θ:

$$\frac{S}{N+J}(\theta) = \frac{\left| \sum_k w_k e^{-j 2 \pi k d \sin \theta} \right|^2}{\sum_k |w_k|^2 + J \left| \sum_k w_k e^{-j 2 \pi k d \sin \theta} \right|^2} \qquad \text{Equation (2)}$$

where S is the desired received signal, N is the noise (normalized to unity on one element), J is the nulled jamming signal, and θ is the arrival angle direction of the signal with respect to the normal to the array. Subscript k denotes the index of summation from 1 to k, where k is the number of elements.

The antenna response to polarization of the desired signals and the jamming signal is taken into account in the summations in Equation (2). The element spacing d in Equation 2 is expressed as a fraction of the wavelength at the carrier frequency.

The objective metric adds the nulled jammer signal power J to the receiver noise power N. A metric for a single jammer signal is described by Equation 2, but this can be generalized to several jammer signals. For the simplicity of this description, the desired signals and the jamming are presumed to be narrowband with respect to the carrier frequency, so the time delay of the received signals at adjacent elements produces a proportional phase shift. However, the result of solving the matrix Equation 1 is that the factor multiplying J≈0, so Equation 2 for the case of several jammer signals effectively reduces to a simpler expression of normalized antenna array gain:

$$\frac{S}{N}(\theta) = \frac{\left|\sum_k w_k e^{-j2\pi kd \sin\theta}\right|^2}{\sum_k |w_k|^2} \qquad \text{Equation (3)}$$

The weights 54 of the opposite-polarization elements 43 are not included in the evaluation of the numerator of Equation 3 because there is no signal output response to the desired same-polarized signals.

In a preferred embodiment, maximizing received signals from all directions with equal gain employs gain pattern optimization using computed performance. A preferred method to obtain the solution for the adaptive weight vector w is the sample matrix inverse as described above. The solution $w=R^{-1}b$ to the sample matrix equation nulls the jammer signals but may give low gain for desired signals S{d} arriving from some directions since the solution alone does not monitor array gain for desired signals S{d}. Therefore, in a preferred embodiment, the antenna array gain pattern is optimized by a computed performance method.

The invention provides a method for maximizing the number of directions of arrival over the coverage sector for which the value of Equation 3 exceeds an adaptive performance threshold T while simultaneously nulling the jammer signal by the solution to Equation 1 for the adaptive element weights 50, 52, 54, 56. Note that the solution is a function of the steering vector b.

A novel dither enhancement method is employed in the invention to optimize the complex steering vector b. If the number of elements to be controlled is K, the complex steering vector b has dimensionality K, so 2K real values must be optimized. Setting the adaptive threshold T to an initial value and initially setting the steering vector b to have one value of unity, the solution to Equation 1 is computed after successively dithering each real value in steering vector b, first positively and then negatively, by a selected increment. After each dither, Equation 3 is computed for the weight solution over the coverage sector. As a typical example, the coverage sector is ±30 degrees in azimuth, and Equation 3 is computed for 61 values of azimuth θ from −30 degrees to +30 degrees. The count of the number of values of azimuth θ at which Equation 3 exceeds T is compared for the two dither polarities, and the corresponding value in the vector b is adjusted by ½ of the selected increment or some other constant of proportionality positively or negatively, to try to increase the count.

An important concept in this dither enhancement method is the threshold T is not preset but is adaptive. The threshold adaptation process increases T if the solution of Equation 3 exceeds T at too many values of arrival angle θ and decreases T if Equation 3 exceeds T at too few values of arrival angle θ. The maximum and minimum count of the number of values of azimuth θ exceeding T is observed over the complete dither cycle of adjusting 2K real values in the vector b. For the above numerical example where Equation 3 is computed at 61 values of azimuth θ, the threshold adaptation is as follows:

If maximum count is 51 then T=T/0.875;
Else if minimum count<10 then T=T×0.875;
Else T=T×0.9375

The last condition has been found desirable to enable the threshold T to slowly decay. The adjustment to T is by a proportional scaling, so that T cannot drop to zero.

Examples of the result of this adaptive antenna array control follow in FIGS. 4 and 5. The array has four omni-directional elements 42, 43 with spacing d=0.7λ, and the sector of coverage θ is ±30 degrees with respect to broadside to the array 40. Three elements 42 are right-hand circularly polarized and one element 43 is left-hand polarized. Circular polarization of the antenna elements 42, 43 is right-hand, right-hand, left-hand and right-hand (R R L R), respectively. A single jammer signal is present.

FIGS. 4 and 5 are charts of normalized antenna gain 72 vs. azimuth 74 for the four-element antenna array 40 using matrix inverse nulling with dither enhancement. FIGS. 4 and 5 show the results of weight 50, 52, 54, 56 optimization for various jamming conditions. For all jamming conditions, the value of the dither equals 0.1, and the initially nonzero value in the steering vector is initialized to 1.0. The threshold T is initialized to 0.1.

In FIG. 4, the normalized antenna gain 76 determined from Equation 3 is also shown when the jammer signal is absent or very weak. The resulting array pattern 76 for the desired signals S{d} is essentially omnidirectional over the ±30 degree azimuth sector θ. If a strong linearly-polarized jammer signal is present at an azimuth θ of 15 degrees, as can be seen from FIG. 4, the array forms a deep null at that azimuth θ. The jamming interference S{j} is effectively removed, while the array pattern for desired signals S{d} remains nearly constant over the sector. The normalized gain 78 for desired signals S{d} has dropped by about 3 dB from the signal 76 in the no-jammer signal case because of the noise introduced by the opposite-polarized element 43.

In FIG. 5, an opposite-polarized jammer signal is eliminated without affecting the gain pattern 92 for the desired signals. A deep null forms on a jammer signal having the same polarization, and the array pattern 94 tends to null desired signals S{d} arriving from azimuth directions θ near the jammer signal. While this technique does not enable a response to desired signals S{d} arriving from nearly the same azimuth θ as a jammer signal with the same polarization, the array pattern 94 retains a high gain at other azimuths.

The computational procedure to optimize the array weights 50, 52, 54, 56 does not have knowledge of the jamming condition. The optimization procedure is the same for all the postulated jammer signal conditions, and as can be seen from FIGS. 4 and 5, good array performance is obtained for all conditions of signal polarization.

An alternate embodiment of this invention is applicable to a communication system simultaneously receiving a number of orthogonally-multiplexed signals in the presence of a jammer signal. Gain pattern optimization in this embodiment employs actual reception of desired signals in the multi-channel demodulator 64 and does not require a quiet time 68. The demodulator 64 provides a measure of performance for each desired signal S{d}, for example a measured signal amplitude, signal-to-noise ratio, or bit error rate.

The desired signals S{d} transmit synchronization (sync) symbols simultaneously, and the receiver uses the sync symbols to measure S/(N+J) for each signal. The method maximizes the number of signals for which S/(N+J)>T to prevent the antenna array 40, as much as possible in the presence of jamming, from forming nulls on strong desired signals S{d}.

The weights w of sensor elements are adjusted to optimize the performance measure for all desired signals S{d} being demodulated. This automatically creates nulls on the jamming signals. Matrix inverse nulling is not needed.

As differentiated from the computed gain pattern discussed earlier, the array performance is the number of actually received desired signals S{d} for which the performance measure exceeds a threshold T. Here again, because the gain pattern is determined by actual jamming, the threshold T needs to be adaptive. In this embodiment, the threshold is raised if the performance measure of too many desired signals exceeds the threshold and is lowered if too few of the desired signals exceeds threshold.

For K complex adaptive weights, the dither scheme described earlier is applied to the 2K real weight values; that is, each weight value is successively dithered first positively then negatively by a selected increment. S/(N+J) is measured for each signal, and the number of signals for which S/(N+J)>T is counted after each individual dither. The weight of one array element 42, 43 is held fixed at 1.0 to prevent the weights from becoming either too small or too large. The weight value is multiplied by ½ and the polarity selected to increase the count. The threshold T is adapted by the scheme described above for sample matrix inversion nulling, except that the actual number of signals being received determines the maximum count at which T is increased.

The dither enhancement scheme in this embodiment also takes full advantage of differences in desired and undesired signal polarization and makes no explicit assumptions on the characteristics of the jamming. Since in a worst case the jamming signal has the same polarization as the desired signals S{d} and nulling based on polarization is unavailable, nulling in such case must be spatial. The array gain pattern will necessarily have nulls in directions of arrival θ near that of the jamming signal. Nevertheless, for any jamming condition, the dither scheme still optimizes the gain pattern for desired signals.

FIGS. 6 and 7 contains plots of the resulting performance under the same jamming conditions previously described for sample matrix inverse nulling. A simulation was done receiving 32 equal-power, orthogonally-coded signals uniformly distributed over the azimuth coverage ±30 degrees. As before, the receiver processing did not know the jamming condition, and the same optimization procedure was done for all conditions. The threshold T is initialized to 10, and the dither initially is 0.05, which is reduced as time progresses.

FIG. 6 is a chart of normalized antenna 72 gain vs. azimuth 74 for a four-element antenna array 40 using dither optimization of the nulling. The chart illustrates the antenna gain 102 for desired signals with no jammer signal_present, antenna gain 106 for desired signals in the presence of a linear polarized jammer signal at 15 degrees azimuth, and antenna gain 104 for undesired signals when the antenna array is nulled for a linear polarized jammer signal incident at 15 degrees azimuth.

FIG. 7 is a chart of normalized antenna gain vs. azimuth for a four-element antenna array using dither optimization of the nulling. The chart illustrates the gain for desired signals in the presence of opposite circular-polarized jammer signal nulling at 15 degrees azimuth. It also shows antenna gain for a desired signal and undesired signals when the antenna array is nulled for a same-polarized jammer signal incident at 15 degrees azimuth. The gain for a jammer signal having opposite polarization is shown as −30 dB or less.

The nulling performance is good under all jamming conditions. None of the desired signals are nulled when the jammer signal is absent 102, linearly-polarized 106, or reverse-polarized 112. When the jammer signal has the same polarization, only desired signals 114 from azimuths θ near the jammer signal are nulled.

Although the present invention has been described in detail with reference to particular preferred and alternative embodiments, persons possessing ordinary skill in the art to which this invention pertains will appreciate that various modifications and enhancements may be made without departing from the spirit and scope of the Claims that follow. The various hardware and software configurations that have been disclosed above are intended to educate the reader about preferred and alternative embodiments, and are not intended to constrain the limits of the invention or the scope of the Claims.

What is claimed is:

1. A method of processing received signals, comprising:

forming a first output signal from transmitted signals received at a first antenna from a plurality of directions of arrival, said received signals including desired signals having a first circular polarization and interfering signals, said first antenna having said first circular polarization;

forming a second output signal from said transmitted signals received at a second antenna, said second antenna having a second circular polarization distinguishably different from said first circular polarization;

selecting an initial first gain to substantially reduce one or more of said interfering signals received at said first antenna during a quiet time in which said interfering signals can be distinguished from said desired signals;

varying said initially selected first gain by a predetermined amount to derive alternative first gains;

computing a performance value for each said alternative first gain at different predetermined directions of arrival of said desired signals;

selecting the first gain from among said initially selected first gain and said alternative first gains that provides the highest number of performance values over a selected threshold value;

selecting a second gain to substantially reduce one or more of said interfering signals received at said second antenna during a quiet time in which said interfering signals can be distinguished from said desired signals;

deriving complex weights corresponding to said selected first gain and second gain; and applying said complex weights to said respective first and second output signals; and combining said first and second output signals to form a third output signal having enhanced gain over the directions of arrival of said desired signals for processing said desired signals.

2. The method of claim 1, further comprising:

increasing said selected threshold value if said highest number of performance values is above a first preselected number; and decreasing said selected threshold value if said highest number of performance values is below a second preselected number.

3. The method of claims 1 or 2, wherein said performance value is the ratio of a desired signal to the sum of said interfering signals and background noise.

4. The method of claim 2, wherein selecting said first gain comprises:

selecting said first gain to substantially enhance the performance value for one or more of said desired signals.

5. The method of claim 4, wherein said performance value is selected from the group comprising signal-to-noise ratio, amplitude, and bit error rate.

6. The method of claim 4, wherein selecting said first gain further comprises:
varying an initially selected first gain by a predetermined amount to derive alternative first gains;
measuring said performance values for each said alternative first gain; and
selecting the first gain from among said initially selected first gain and said alternative first gains that provides the highest number of performance values over a selected threshold value.

7. The method of claim 6, further comprising:
increasing said selected threshold value if said highest number of performance values is above a first preselected number; and
decreasing said selected threshold value if said highest number of performance values is below a second preselected number.

8. The method of claims 6 or 7, wherein said performance value is the ratio of said desired signals to the sum of said interfering signals and background noise.

9. A method of processing received signals, comprising:
forming a first output signal from transmitted signals received at an antenna array from a plurality of directions of arrival, said received signals including desired signals having a first circular polarization and interfering signals, said antenna array comprising a plurality of first antennas having said first circular polarization, said first output signal formed from signals received during a quiet time in which said interfering signals can be distinguished from said desired signals;
forming a second output signal from said transmitted signals received at a second antenna, said second antenna having a second circular polarization distinguishably different from said first circular polarization, said second output signal formed from signals received during a quiet time in which said interfering signals can be distinguished from said desired signals;
selecting an initial complex steering vector;
deriving an array gain pattern corresponding to said initial steering vector;
varying each real value and each imaginary value of said initial steering vector by a predetermined amount to derive alternative steering vectors;
computing an array performance value for each said alternative steering vector over said range of directions;
selecting the gain pattern corresponding to the steering vector that provides array performance values over a selected threshold value for the highest number of directions of arrival
selecting a second gain to substantially reduce one or more of said interfering signals received at said second antenna;
deriving complex weights corresponding to said selected gain pattern and second gain;
applying said complex weights to said respective output signals; and
combining said weighted first and second output signals to form a third output signal having enhanced gain over the directions of arrival of said desired signals for processing said desired signals.

10. The method of claim 9, further comprising:
increasing said selected threshold value if said highest number of directions of arrival is above a first preselected number; and
decreasing said selected threshold value if said highest number of directions of arrival is below a second preselected number.

11. The method of claims 9 or 10, wherein said array performance value is a signal-to-noise ratio.

12. The method of claim 11, wherein said array performance value is the ratio of said desired signal to the sum of said interfering signals and background noise.

13. The method of claim 9, wherein selecting said gain pattern further comprises:
varying each real value and each imaginary value of an initially selected gain pattern by a predetermined amount to derive alternative gain patterns;
measuring an array performance value for each received desired signal for each said alternative gain pattern; and
selecting the gain pattern from among said initially selected gain pattern and said alternative gain patterns that provides array performance values over a selected threshold value for the highest number of received desired signals.

14. The method of claim 13, further comprising:
increasing said selected threshold value if said highest number of received desired signals is above a first preselected number; and
decreasing said selected threshold value if said highest number of received desired signals is below a second preselected number.

15. The method of claims 13 or 14, wherein said array performance value is a signal-to-noise ratio.

16. The method of claim 15, wherein said array performance value is the ratio of said desired signal to the sum of said interfering signals and background noise.

17. A receiver, comprising:
a first antenna for forming a first output signal from signals received from a plurality of directions of arrival, said received signals including interfering signals and desired signals having a first circular polarization, said first antenna having said first circular polarization, said first antenna for forming said first output signal from signals received during a quiet time in which said interfering signals can be distinguished from said desired signals;
a second antenna for forming a second output signal from said received signals, said second antenna having a second circular polarization distinguishably different from said first circular polarization, said second antenna for forming said second output signal from signals received during a quiet time in which said interfering signals can be distinguished from said desired signals; and
a processor connected to said first and second antennas for substantially reducing one or more of said received interfering signals in a third output signal by varying an initially selected first gain by a predetermined amount to derive alternative first gains, computing performance values for each alternative first gain at different predetermined directions of arrival of said desired signals, and selecting the first gain from among said initially selected first gain and said alternative first gains that provides the highest number of array performance values over a selected threshold value, selecting a second gain related to said interfering signals received at said second antenna, deriving complex weights corresponding to said selected first gain and second gain, applying said complex weights to said respective first and second output signal, and linearly combining said weighted first and second output signals to form said third output signal having enhanced gain over the directions of arrival of said desired signals.

18. The receiver of claim 17, wherein said processor further comprises:
    a processor for increasing said selected threshold value if said highest number of performance values is above a first preselected number, and decreasing said selected threshold value if said highest number of performance values is below a second preselected number.

19. The receiver of claims 17 or 18, wherein said performance value is the ratio of a desired signal to the sum of said interfering signals and background noise.

20. The receiver of claim 17, wherein said processor further comprises:
    a processor for varying an initially selected first gain by a predetermined amount to derive alternative first gains, measuring a performance value for each said alternative first gain, and selecting the first gain from among said initially selected first gain and said alternative first gains that provides the highest number of array performance values over a selected threshold value.

21. The receiver of claim 20, wherein said processor further comprises:
    a processor for increasing said selected threshold value if said highest number of performance values is above a first preselected number, and decreasing said selected threshold value if said highest number of performance values is below a second preselected number.

22. The receiver of claims 20 or 21, wherein said performance value is the ratio of said desired signals to the sum of said interfering signals and background noise.

23. A receiver, comprising:
    an antenna array comprising a plurality of first antennas for forming a first output signal from signals received from a plurality of directions of arrival, said received signals including desired signals having a first circular polarization and interfering signals, said first antennas having said first circular polarization, said first antennas for forming said first output signal from signals received during a quiet time in which no desired signals are transmitted;
    a second antenna for forming a second output signal from said received signals, said second antenna having a second circular polarization distinguishably different from said first circular polarization, said second antenna for forming said second output signal from signals received during a quiet time in which no desired signals are transmitted; and
    a processor connected to said first and second antennas for selecting a gain pattern for said antenna array to substantially reduce one or more of said received interfering signals by selecting an initial complex steering vector, deriving the array gain pattern corresponding to said selected steering vector, varying each real value and each imaginary value of said selected steering vector by a predetermined amount to derive alternative steering vectors, computing array performance values for each said alternative steering vector over said range of directions, and selecting the gain pattern of the steering vector that provides array performance values over a selected threshold value for the highest number of directions of arrival, selecting a second gain for said second antenna to substantially reduce one or more of said received interfering signals, deriving complex weights for each antenna corresponding to said selected gain pattern and second gain, applying said complex weights to said respective first and second output signals, and linearly combining said weighted first and second output signals to form a third output signal having enhanced gain over the directions of arrival of said desired signals.

24. The receiver of claim 23, wherein said processor further comprises:
    a processor for increasing said selected threshold value if said highest number of directions of arrival is above a first preselected number, and decreasing said selected threshold value if said highest number of directions of arrival is below a second preselected number.

25. The receiver of claims 23 or 24, wherein said array performance value is a signal-to-noise ratio.

26. The receiver of claim 25, wherein said array performance value is the ratio of said desired signal to the sum of said interfering signals and background noise.

27. The receiver of claim 23, wherein said processor comprises:
    a processor for measuring a performance value for each received desired signal and selecting said gain pattern to substantially enhance the performance value of one or more of said received desired signals.

28. The receiver of claim 27, wherein said performance value is selected from the group of values comprising signal-to-noise ratio, amplitude, and bit error rate.

29. The receiver of claim 23, wherein said processor further comprises:
    a processor for varying each real value and each imaginary value of an initially selected gain pattern by a predetermined amount to derive alternative gain patterns, measuring an array performance value for each received desired signal at each alternative gain pattern, and selecting the gain pattern from among said initially selected gain pattern and said alternative gain patterns that provides array performance values over a selected threshold value for the highest number of received desired signals.

30. The receiver of claim 29, wherein said processor further comprises:
    a processor for increasing said selected threshold value if said highest number of received desired signals is above a first preselected number, and decreasing said selected threshold value if said highest number of received desired signals is below a second preselected number.

31. The receiver of claims 29 or 30, wherein said array performance value is a signal-to-noise ratio.

32. The receiver of claim 31, wherein said array performance value is the ratio of said desired signal to the sum of said interfering signals and background noise.

33. A method of processing received signals, comprising sequentially:
    forming a first output signal from transmitted signals received at a first antenna, said received signals including desired signals having a first circular polarization and interfering signals, said first antenna having said first circular polarization;
    forming a second output signal from said transmitted signals received at a second antenna, said second antenna having a second circular polarization distinguishably different from said first circular polarization;

selecting first and second gains related to said interfering signals received at said first and second antenna, respectively, during a quiet time in which said interfering signals can be distinguished from said desired signals, said first and second gains selected to substantially reduce one or more of said interfering signals received at said first and second antennas;

varying an initially selected first gain by a predetermined amount to derive alternative first gains;

computing a performance value for each said alternative first gain at different predetermined directions of arrival of said desired signals;

selecting the first gain from among said initially selected first gain and said alternative first gains that provides the highest number of performance values over a selected threshold value;

deriving complex weights corresponding to said selected first gain and second gain;

applying said complex weights to said respective first and second output signals; and then minimizing said interfering signals by combining said first and second output signals to form a third output signal for processing said desired signals.

34. The method of claim 33, wherein said performance value is the ratio of a desired signal to the sum of said interfering signals and background noise.

35. The method of claim 33, further comprising:

increasing said selected threshold value if said highest number of performance values is above a first preselected number; and decreasing said selected threshold value if said highest number of performance values is below a second preselected number.

36. The method of claim 35, wherein said performance value is the ratio of a desired signal to the sum of said interfering signals and background noise.

37. The method of claim 35, wherein selecting said first gain comprises:

selecting said first gain to substantially enhance the performance value for one or more of said desired signals.

38. The method of claim 37, wherein selecting said first gain further comprises:

varying an initially selected first gain by a predetermined amount to derive alternative first gains;

measuring said performance values for each said alternative first gain; and selecting the first gain from among said initially selected first gain and said alternative first gains that provides the highest number of performance values over a selected threshold value.

39. The method of claim 38, wherein said performance value is the ratio of said desired signals to the sum of said interfering signals and background noise.

40. The method of claim 38, further comprising:

increasing said selected threshold value if said highest number of performance values is above a first preselected number; and decreasing said selected threshold value if said highest number of performance values is below a second preselected number.

41. The method of claim 40, wherein said performance value is the ratio of said desired signals to the sum of said interfering signals and background noise.

42. The method of claim 33, wherein forming said first output signal further comprises:

measuring a performance value for each of said desired signals.

43. A method of processing received signals, comprising sequentially:

forming a first output signal from transmitted signals received at an antenna array during a quiet time in which interfering signals can be distinguished from desired signals, said received signals including at least said interfering signals, said desired signals having a first circular polarization and said antenna array comprising a plurality of first antennas having said first circular polarization;

forming a second output signal from said transmitted signals received at a second antenna during a quiet time in which said interfering signals can be distinguished from said desired signals, said second antenna having a second circular polarization distinguishably different from said first circular polarization;

selecting an initial complex steering vector to substantially reduce the array gain in the direction of arrival of one or more of said interfering signals received at said first antenna over a predetermined range of directions;

deriving an array gain pattern corresponding to said initial steering vector;

varying each real value and each imaginary value of said initial steering vector by a predetermined amount to derive alternative steering vectors;

computing an array performance value for each said alternative steering vector over said range of directions;

selecting the gain pattern corresponding to the steering vector that provides array performance values over a selected threshold value for the highest number of directions of arrival;

selecting a second gain for said second antenna to substantially reduce one or more of said interfering signals;

deriving complex weights corresponding to said selected gain pattern and second gain;

applying said complex weights to said respective output signals; and minimizing said interfering signals by combining said weighted first and second output signals to form a third output signal for processing said desired signals.

44. The method of claim 43, wherein said array performance value is a signal-to-noise ratio.

45. The method of claim 44, further comprising:

increasing said selected threshold value if said highest number of directions of arrival is above a first preselected number; and decreasing said selected threshold value if said highest number of directions of arrival is below a second preselected number.

46. The method of claim 45, wherein said array performance value is a signal-to-noise ratio.

47. The method of claim 46, wherein said array performance value is the ratio of said desired signal to the sum of said interfering signals and background noise.

48. The method of claim 17, wherein selecting said gain pattern comprises:

selecting said gain pattern to substantially enhance the performance value of one or more of said received desired signals.

49. The method of claim 48, wherein said performance value is selected from the group of values comprising signal-to-noise ratio, amplitude, and bit error rate.

50. The method of claim 43, wherein forming said first output signal further comprises:

measuring a performance value for each received desired signal.

51. The method of claim 50, wherein selecting said gain pattern further comprises:

varying each real value and each imaginary value of an initially selected gain pattern by a predetermined amount to derive alternative gain patterns;

measuring an array performance value for each received desired signal for each said alternative gain pattern; and selecting the gain pattern from among said initially selected gain pattern and said alternative gain patterns that provides array performance values over a selected threshold value for the highest number of received desired signals.

52. The method of claim 51, wherein said array performance value is a signal-to-noise ratio.

53. The method of claim 52, wherein said array performance value is the ratio of said desired signal to the sum of said interfering signals and background noise.

54. The method of claim 51, further comprising:

increasing said selected threshold value if said highest number of received desired signals is above a first preselected number; and decreasing said selected threshold value if said highest number of received desired signals is below a second preselected number.

55. The method of claim 54, wherein said array performance value is a signal-to-noise ratio.

56. The method of claim 55, wherein said array performance value is the ratio of said desired signal to the sum of said interfering signals and background noise.

57. A receiver, comprising:

a first antenna for forming a first output signal from received signals, said received signals including interfering signals and desired signals having a first circular polarization, said first antenna having said first circular polarization;

a second antenna for forming a second output signal from said received signals, said second antenna having a second circular polarization distinguishably different from said first circular polarization; and a circuit connected to said first and second antennas for minimizing said interfering signals by selecting a first gain related to said interfering signals received at said first antenna and a second gain related to said interfering signals received at said second antenna, respectively, during a quiet time in which said interfering signals can be distinguished from said desired signals, said first and second gains selected to substantially reduce one or more of said interfering signals received at said first and second antennas, said circuit further for varying an initially selected first gain by a predetermined amount to derive alternative first gains, computing performance values for each alternative first gain at different predetermined directions of arrival of said desired signals, selecting the first gain from among said initially selected first gain and said alternative first gains that provides the highest number of array performance values over a selected threshold value, and then deriving complex weights corresponding to said selected first gain and second gain, applying said complex weights to said respective first and second output signal, and linearly combining said weighted first and second output signals to form a third output signal.

58. The receiver of claim 57, wherein said performance value is the ratio of a desired signal to the sum of said interfering signals and background noise.

59. The receiver of claim 57, wherein said circuit further comprises:

a circuit for increasing said selected threshold value if said highest number of performance values is above a first preselected number, and decreasing said selected threshold value if said highest number of performance values is below a second preselected number.

60. The receiver of claim 59, wherein said performance value is the ratio of a desired signal to the sum of said interfering signals and background noise.

61. The receiver of claim 57, wherein said circuit further comprises:

a circuit for measuring a performance value for each of said desired signals and selecting said first gain to substantially enhance said performance value for one or more of said received desired signals.

62. The receiver of claim 61, wherein said performance value is selected from the group comprising signal-to-noise ratio, amplitude, and bit error rate.

63. The receiver of claim 61, wherein said circuit further comprises:

a circuit for varying an initially selected first gain by a predetermined amount to derive alternative first gains, measuring the performance value for each said alternative first gain, and selecting the first gain from among said initially selected first gain and said alternative first gains that provides the highest number of array performance values over a selected threshold value.

64. The receiver of claim 63, wherein said performance value is the ratio of said desired signals to the sum of said interfering signals and background noise.

65. The receiver of claim 63, wherein said circuit further comprises:

a circuit for increasing said selected threshold value if said highest number of performance values is above a first preselected number, and decreasing said selected threshold value if said highest number of performance values is below a second preselected number.

66. The receiver of claim 65, wherein said performance value is the ratio of said desired signals to the sum of said interfering signals and background noise.

67. A receiver, comprising:

an antenna array comprising a plurality of first antennas for forming a first output signal from transmitted signals received during a quiet time in which interfering signals can be distinguished from desired signals, said received signals including at least said interfering signals, said desired signals having a first circular polarization and said antenna array comprising a plurality of first antennas having said first circular polarization;

a second antenna for forming a second output signal from said transmitted signals received during a quiet time in which said interfering signals can be distinguished from said desired signals, said second antenna having a second circular polarization distinguishably different from said first circular polarization; and a circuit connected to said first and second antennas for minimizing said interfering signals by selecting an initial complex steering vector to substantially reduce the array gain in the direction of arrival of one or more of said interfering signals received at said first antenna over a predetermined range of directions, deriving an array gain pattern corresponding to said initial steering vector, varying each real value and each imaginary value of said initial steering vector by a predetermined amount to derive alternative steering vectors, computing an array performance value for each said alternative steering vector over said range of directions, selecting the gain pattern corresponding to the steering vector that provides array performance values over a selected threshold value for the highest number of directions of arrival, selecting a second gain for said second antenna to substantially reduce one or more of said interfering signals, and then deriving complex weights corresponding to said selected gain pattern and second gain, applying said complex weights to said respective first and second output signals, and linearly combining said weighted first and second output signals to form a third output signal for processing said desired signals.

68. The receiver of claim 67, wherein said array performance value is a signal-to-noise ratio.

69. The receiver of claim 67, wherein said circuit comprises:

a circuit for increasing said selected threshold value if said highest number of directions of arrival is above a first preselected number, and for decreasing said selected threshold value if said highest number of directions of arrival is below a second preselected number.

70. The receiver of claim 69, wherein said array performance value is a signal-to-noise ratio.

71. The receiver of claim 70, wherein said array performance value is the ratio of said desired signal to the sum of said interfering signals and background noise.

72. The receiver of claim 67, wherein said circuit comprises:

a circuit for measuring a performance value for each received desired signal.

73. The receiver of claim 72, wherein said circuit for selecting said gain pattern comprises:

a circuit for selecting said gain pattern to substantially enhance the performance value of one or more of said received desired signals.

74. The receiver of claim 73, wherein said performance value is selected from the group of values comprising signal-to-noise ratio, amplitude, and bit error rate.

75. The receiver of claim 72, wherein said circuit for selecting said gain pattern further comprises:

a circuit for varying each real value and each imaginary value of an initially selected gain pattern by a predetermined amount to derive alternative gain patterns, measuring an array performance value for each received desired signal for each said alternative gain pattern, and selecting the gain pattern from among said initially selected gain pattern and said alternative gain patterns that provides array performance values over a selected threshold value for the highest number of received desired signals.

76. The receiver of claim 75, wherein said array performance value is a signal-to-noise ratio.

77. The receiver of claim 76, wherein said array performance value is the ratio of said desired signal to the sum of said interfering signals and background noise.

78. The receiver of claim 75, wherein said circuit further comprises:

a circuit for increasing said selected threshold value if said highest number of received desired signals is above a first preselected number, and for decreasing said selected threshold value if said highest number of received desired signals is below a second preselected number.

79. The receiver of claim 78, wherein said array performance value is a signal-to-noise ratio.

80. The receiver of claim 79, wherein said array performance value is the ratio of said desired signal to the sum of said interfering signals and background noise.

* * * * *